Parkhurst & Bullock,
Making Wooden Screws.
Nº 13,225.  Patented July 10, 1855.
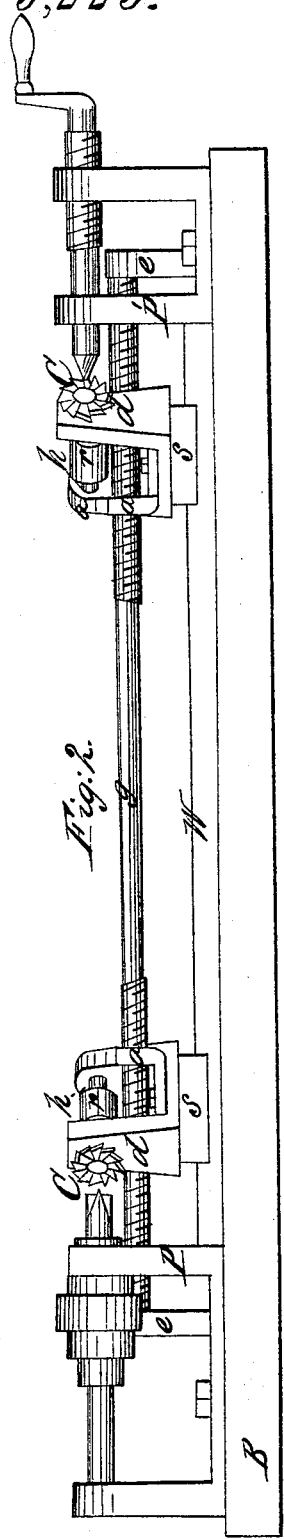
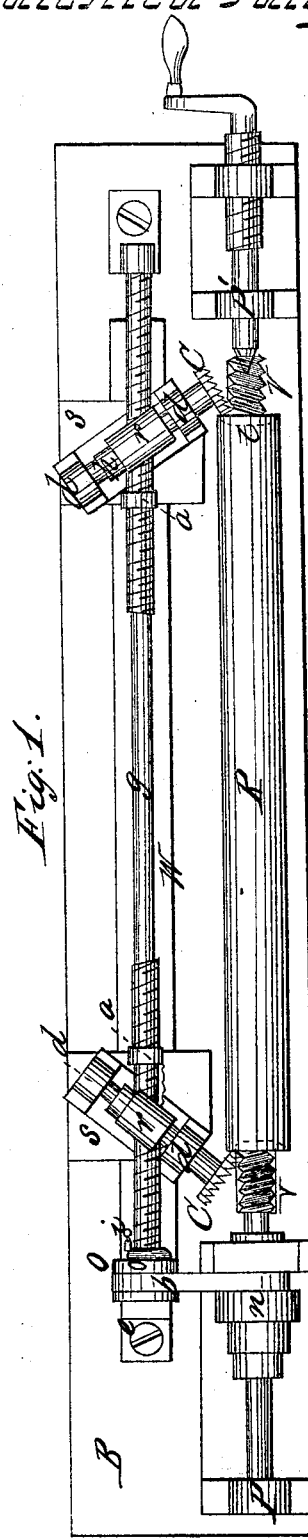

UNITED STATES PATENT OFFICE.

O. PARKHURST AND D. BULLOCK, OF COHOES, NEW YORK.

MACHINE FOR CUTTING SCREWS ON BEDSTEADS.

Specification of Letters Patent No. 13,225, dated July 10, 1855.

*To all whom it may concern:*

Be it known that we, ORSON PARKHURST and DANIEL BULLOCK, both of Cohoes, in the county of Albany and State of New York, have invented a new, useful, and improved apparatus for cutting screws on the rails of bedsteads, and for such other purposes as it may be usefully applied to, and we do hereby declare that the same is described and represented in the following specification and in the accompanying drawings.

The nature of our invention consists in fastening an additional way to the frame of the lathe in which the rail is turned, upon which way two carriages are fitted to traverse toward and from each other by means of a right and left screw, which turns in stands fastened to the frame of the lathe. Each of the carriages carries a head stock containing a shaft which lies at an angle of about 45 degrees to the rail to be cut, and has a pulley upon it to be operated by a belt, and turn a cutter fastened to the end of the shaft, which cuts a score in the tenon on the end of the rail, forming a screw as the cutters are traversed by the right and left screw acting upon the carriages, said screw being operated by pulleys and belt on the screw and arbor of the lathe or otherwise, so as to cut the thread on the tenon in, under the concave shoulder on the rail, and save countersinking the parts or scoring out the tenon next to the shoulder.

To enable others skilled in the art to make and use our invention we will proceed to describe its construction and the mode of using it referring to the drawings above mentioned, in which the same letters indicate like parts in each of the figures.

Figure 1 is a plan and Fig. 2 an elevation of the top of a turning lathe with our improved apparatus applied to it.

B, the top of a common lathe; P, the head stock, and P¹ tail stock made in the form represented.

W is a bar made widest at the top or dovetailing and fastened to the top B. The carriages S S are provided with a dovetailing score across their under side which fits onto the bar or ways W upon which they traverse and carry the headstocks $d$, $d$, which may be set at the angle desired by loosening the screws which pass through the ends of the nuts $a$, $a$, and through the bottoms of the head stocks into the carriages, and placing the head stocks in the desired position and tightening them again. The right and left screw $g$ is fitted to turn in the nuts $a$ $a$ and is provided with a pivot at each end which pivots turn in the stands $e$ $e$ fastened to the top B. There is a collar $f$ fastened to the right and left screw, and the loose pulley $o$ is fitted to turn between the collar $f$, and stand $e$, when it is operated by the belt $b$, from the pulley $n$, upon the spindle of the lathe.

The cutters C C are made in the form represented with teeth upon one side and on the periphery and are fastened to the arbors $h$, $h$, which are fitted to turn in the head stocks $d$ $d$ which arbors $h$ $h$ are operated to turn the cutters, by belts from some convenient power to the pulleys $r$ $r$ fastened to the arbors. There is a hole through the collar $f$ and one in the pulley to correspond with it so that the pulley may be made to operate the screw by inserting the pin $i$ which connects them together.

Our improved apparatus having been constructed as above described we prefer to set the head stocks so that the angles of the scores in the screws cut on the tenon of the rail will be equal whether the peripheries of the cutters are beveled more or less. The head stocks which carry the cutters are traversed out each way near the head stocks by turning the spindle of the lathe backward and the pin $i$ is withdrawn; when a stick of timber of a proper length is put into the lathe and made in the desired form by turning it in the usual manner, the shoulders to the tenons being turned concave as represented by dotted lines $t$ $t$, when the lathe is stopped and the pin $i$ inserted so as to connect the pulley $o$, to operate the screw and the cutters C, C, are put in rapid motion and the spindle of lathe with the rail R is turned slowly backward. The belt $b$, carries the screw and traverses the carriages and cutters which cut the scores in the tenons of the rail R, and form the threads of the screws V V, on the tenons. The cutters being arranged at an angle as represented, and traversed parallel which enables us to cut the score in the tenon up under the concave shoulder, and thereby save the labor and expense of countersinking the parts, or turning a score around the tenon next to the shoulder.

If the apparatus is constructed as described and represented, and the screw is operated with an open belt, the motion of the wood as it is fed to the cutter is in the same direction as the motion of the cutter, but by changing the ends of the screw and operating it with a crossed belt or gears instead of pulleys the motion of the wood as it is fed would be against the motion of the cutter. By using a very small cutter and setting the head stocks $d\ d$ and arbors in a position nearly at right angles to the position in which they are represented the scores in the tenons can be cut up under the shoulders, but we prefer the large cutters as they do the work far better and more expeditiously than the small ones.

By using our improvements we can cut better and more perfect screws even upon knotty or imperfect wood with one tenth of the time and labor heretofore required, thereby saving ninety per cent of the cost, at the same time that we make far better and more desirable screws upon our rails.

What we claim as our invention and desire to secure by Letters Patent is—

Arranging and operating the rotary cutters at an angle, so that we can traverse them parallel to the rail and cut under the concave shoulder, substantially as described.

ORSON PARKHURST.
DANIEL BULLOCK.

Witnesses:
JOHN HASTINGS,
H. D. FULLER.